United States Patent
Meissner et al.

(10) Patent No.: US 8,897,981 B2
(45) Date of Patent: Nov. 25, 2014

(54) METHOD FOR DETERMINING AN ADJUSTMENT PARAMETER FOR A HYDRAULIC ACTUATOR ARRANGEMENT IN A MOTOR VEHICLE DRIVETRAIN

(71) Applicant: GETRAG Getriebe- und Zahnradfabrik Hermann Hagenmeyer GmbH & Cie KG, Untergruppenbach (DE)

(72) Inventors: Jörg Meissner, Bretzfeld (DE); Hans-Peter Moosmann, Schramberg (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 0 days.

(21) Appl. No.: 14/061,809

(22) Filed: Oct. 24, 2013

(65) Prior Publication Data

US 2014/0109999 A1   Apr. 24, 2014

(30) Foreign Application Priority Data

Oct. 24, 2012   (DE) .......................... 10 2012 021 211

(51) Int. Cl.
*F16D 48/02* (2006.01)
*F16D 48/06* (2006.01)

(52) U.S. Cl.
CPC ................ *F16D 25/14* (2013.01); *F16D 48/06* (2013.01)
USPC .......................................................... 701/68

(58) Field of Classification Search
USPC ........................................ 701/68; 137/565.11
See application file for complete search history.

(56) References Cited

U.S. PATENT DOCUMENTS

| | | | |
|---|---|---|---|
| 5,216,606 A | 6/1993 | Lentz et al. | |
| 5,853,076 A | 12/1998 | McKee et al. | |
| 6,292,732 B1 | 9/2001 | Steinmetz et al. | |
| 8,050,835 B2 * | 11/2011 | Wilson et al. | 701/68 |
| 2009/0105039 A1 * | 4/2009 | Sah et al. | 477/5 |
| 2010/0094517 A1 * | 4/2010 | Takei et al. | 701/68 |
| 2010/0152985 A1 * | 6/2010 | Petzold et al. | 701/68 |
| 2010/0268427 A1 * | 10/2010 | Kabrich | 701/55 |

FOREIGN PATENT DOCUMENTS

| | | |
|---|---|---|
| DE | 19652244 A1 | 6/1997 |
| DE | 10244393 A1 | 4/2004 |
| DE | 102007057081 B4 | 12/2009 |
| DE | 102011108903 A1 | 2/2012 |

* cited by examiner

*Primary Examiner* — Edwin A Young
(74) *Attorney, Agent, or Firm* — Reising Ethington P.C

(57) ABSTRACT

Method for determining an adjustment parameter in a hydraulic actuator arrangement for a motor vehicle drivetrain. The actuator arrangement has a pump and a hydraulic cylinder. A pressure port of the pump is connected to a port of the hydraulic cylinder. The adjustment parameter is a function of the volume of the fluid that must be delivered by the pump in order to realize a predetermined operating point of the actuator arrangement. The operating point is defined by a value pair of an operating point rotational speed value of the pump and an operating point control value of the pump. The method has the steps: regulating the pump to the operating point rotational speed value such that the pump delivers a fluid volume flow rate corresponding to the operating point rotational speed value; and integrating the fluid volume flow rate over the time until a termination operating state of the actuator arrangement, in which the control value of the pump is less than or equal to the operating point control value.

14 Claims, 3 Drawing Sheets

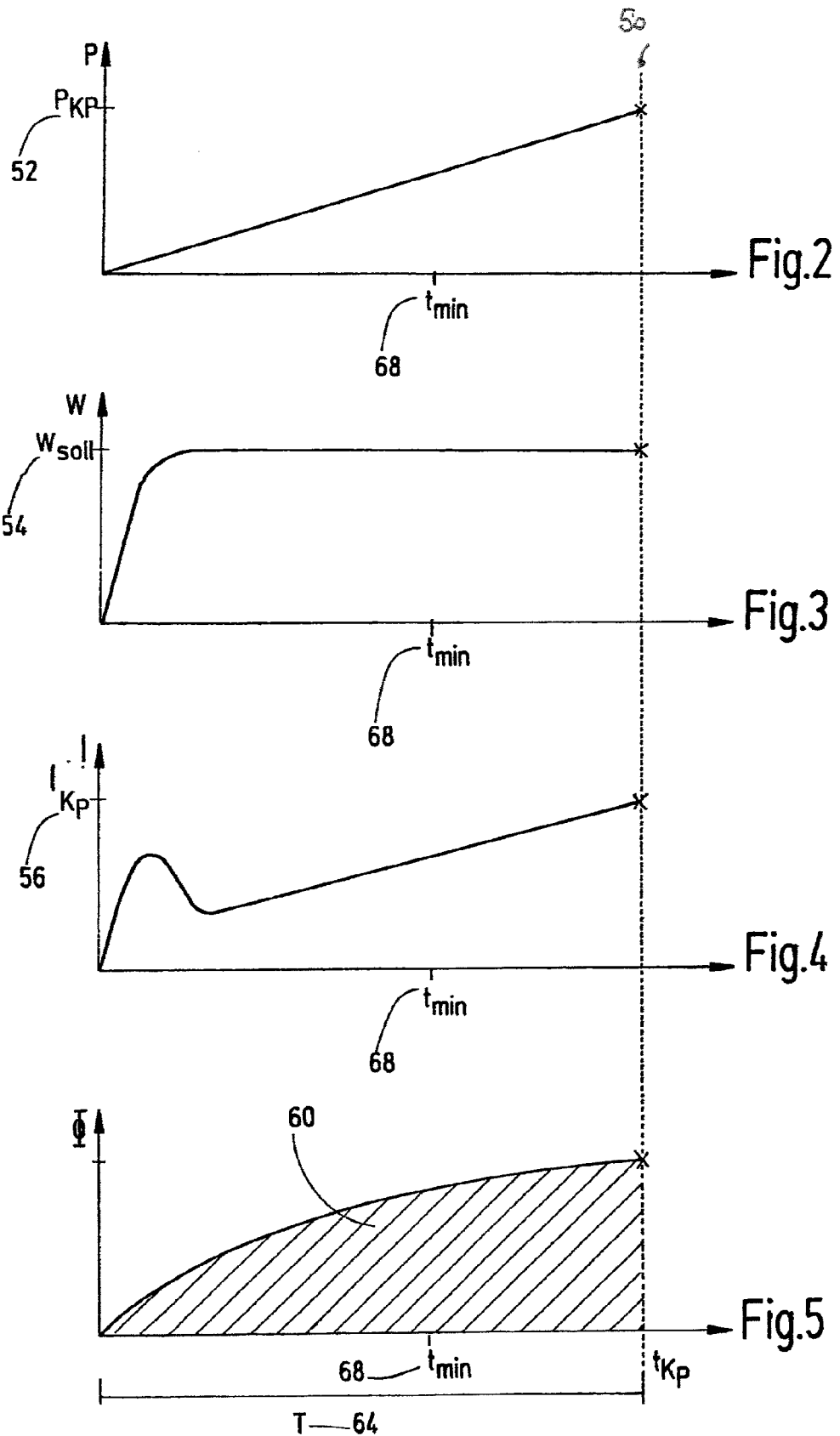

METHOD FOR DETERMINING AN ADJUSTMENT PARAMETER FOR A HYDRAULIC ACTUATOR ARRANGEMENT IN A MOTOR VEHICLE DRIVETRAIN

CROSS-REFERENCE TO RELATED APPLICATIONS

This application claims the priority of German patent application DE 10 2012 021 211.9, filed on Oct. 24, 2012.

BACKGROUND

The present invention relates to a method for determining an adjustment parameter for a hydraulic actuator arrangement in a motor vehicle drivetrain, wherein the actuator arrangement has a pump and a hydraulic cylinder and a pressure port of the pump is connected to a port of the hydraulic cylinder, wherein the adjustment parameter is a function of the volume of the fluid that must be delivered by the pump in order to realize a predetermined operating point of the actuator arrangement, wherein the operating point is defined by a value pair of an operating point rotational speed value of the pump and an operating point control value of the pump.

The present invention also relates to a method for actuating a friction clutch of a motor vehicle drivetrain by means of a hydraulic actuator arrangement of the type mentioned in the introduction, wherein the friction clutch is coupled to a piston of the hydraulic cylinder, and wherein an operating point of the actuator arrangement corresponds to an operating point of the friction clutch.

Hydraulic actuators of said type are used in particular for the automatic engagement of gears in automated transmissions for motor vehicles, or for the automatic actuation of clutches within a drivetrain of a motor vehicle. Here, the elements to be actuated generally have certain operating points at which, for example, a gear is engaged or a clutch begins to transmit a first torque. Here, adjustment to said operating points must be performed, and said operating points must be set, as quickly and precisely as possible by means of the actuators.

Owing to wear and abrasion, said operating points are however constantly subject to changes, which must often be compensated already during operation in order to permit efficient and comfortable operation. External conditions, for example as a result of temperature changes, also have an influence on the present operating point of an element to be actuated. Here, this relates not only to the elements to be actuated but also to the actuator arrangements themselves. The actuators to be controlled must consequently be continuously adapted to the changed operating points during ongoing operation.

One very important operating point in a motor vehicle drivetrain is, for example, the engagement point of the friction clutch which connects the drive to the transmission and which, in an automated drivetrain, is actuated by means of an actuator arrangement mentioned in the introduction. In technical parlance, this operating point is often referred to as the biting or kiss point, and the corresponding method for determining said point is referred to as biting or kiss point adaptation. Here, the biting point is defined as the point at which the closing friction clutch transmits a first, low torque in the range of less than 10 Nm. To permit smooth and comfortable clutch engagement, it is necessary, in the case of an automated transmission, for said point to be determined as accurately as possible and to subsequently be set as precisely as possible by the actuator arrangement. A method for biting point adaptation is known for example from DE 196 52 244 A1.

A further method for determining the operating point of an automatically actuated friction clutch is disclosed in DE 102 44 393 A1. Here, in the actuator performing the actuation, the different pressure profiles are measured at a hydraulic cylinder, and the operating point is determined on the basis of the characteristic curve thus recorded. For this purpose, the actuator arrangement has various pressure sensors that are evaluated by means of a control unit.

DE 10 2007 057 081 B4 presents a further biting point adaptation method in which, to determine the biting point, use is made of rotational speed measurements at the corresponding shafts in the drivetrain. Here, a measurement of the pressure in the actuators that perform the actuation is not necessary.

U.S. Pat. No. 5,853,076 describes a method with which an actuator arrangement can be continuously readjusted in accordance with the adaptation methods described above. Here, the method utilizes the fact that pressure sensors are already provided in the actuator arrangement for the biting point adaptation, by means of which pressure sensors it is possible to measure the pressure profiles in the hydraulic cylinders that actuate the clutch. The actuator arrangement can be readjusted on the basis of the measurement values thus obtained.

A disadvantage of the known adjustment methods for hydraulic actuator arrangements is however that they are regulated as a function of the pressure conditions at the hydraulic cylinder, and thus always require the measurement of the pressure at the cylinder. This inevitably requires additional pressure sensors within the actuator arrangements, which pressure sensors are however no longer required in the case of some biting point adaptation methods.

SUMMARY

Against this background, it is the object of the present invention to specify an improved adjustment method for an actuator arrangement, which adjustment method makes do without additional sensors, and an improved method for the actuation of a friction clutch on the basis of an actuator arrangement of said type.

Said object is achieved firstly by means of a method for determining an adjustment parameter for a hydraulic actuator arrangement in a motor vehicle drivetrain, wherein the actuator arrangement has a pump and a hydraulic cylinder and a pressure port of the pump is connected to a port of the hydraulic cylinder, wherein the adjustment parameter is a function of the volume of the fluid that must be delivered by the pump in order to realize a predetermined operating point of the actuator arrangement, wherein the operating point is defined by a value pair of an operating point rotational speed value of the pump and an operating point control value of the pump, having the steps:

regulating the pump to the operating point rotational speed value such that the pump delivers a fluid volume flow rate corresponding to the operating point rotational speed value; and integrating the fluid volume flow rate over the time until a termination operating state of the actuator arrangement, in which the control value of the pump is less than or equal to the operating point control value.

Furthermore, the above object is achieved by means of a method for actuating a friction clutch of a motor vehicle drivetrain by means of a hydraulic actuator arrangement which has a pump and a hydraulic cylinder, wherein a pressure port of the pump is connected to a port of the hydraulic cylinder, wherein the friction clutch is coupled to a piston of the hydraulic cylinder, and wherein an operating point of the actuator arrangement, which corresponds to an operating point of the friction clutch, is adjusted using an adjustment parameter that has been determined by means of the determination method mentioned above.

The invention is thus based on the concept of using operating point values that have been gained for example from a biting point adaptation to measure the volume required for the filling of the hydraulic cylinder that performs the actuation, without the need for additional sensors to be incorporated in the actuator. For this purpose, the time and the rotational speed are measured until the hydraulic cylinder has been filled so as to attain the present operating point. By means of the pump characteristic curve, it is possible from the measured time duration and the rotational speed to determine the fill volume, which can be used for example as an adjustment parameter for a precontroller. An additional pressure sensor is thus optional and is preferably no longer required for said method.

In particular in the case of modern biting point adaptation methods which, for adjustment, take into consideration parameters other than the pressure in the hydraulic cylinder that performs the actuation, it is possible to dispense entirely with additional pressure sensors. Simpler, compact and consequently inexpensive production of the actuator arrangement is consequently made possible.

The actuator arrangement used in the course of the determination method can preferably be realized without expensive and complex pressure regulating valves. This is because the pressure in the hydraulic cylinder can generally be set by means of the rotational speed of the pump. Here, the pump is preferably coupled to an electric motor.

Since pressure regulating valves in particular in the form of proportional valves are not necessary, the cleanliness requirements, and consequently the costs, during the assembly of the actuator arrangement can be kept low.

The abovementioned object is thus achieved in its entirety.

In one preferred embodiment of the parameterization method, the adjustment parameter includes the fluid volume measured by means of the integration step.

The volume flow rate of the pump is dependent on the rotational speed of the pump and is predefined by the characteristic curve of the pump. Integration of said function over the filling time directly yields, as a result, the volume that has flowed into the hydraulic cylinder in order to attain the operating point to be actuated. The determined parameter may be fed back directly to the precontroller. The filling process can subsequently be adapted on the basis of a setpoint-value/actual-value comparison.

In a further preferred embodiment, the adjustment parameter includes the filling time required for attaining the termination operating state.

In this embodiment, it is possible for not only the measured volume but also the required filling time to be fed back as parameters to the precontroller. Said parameters may for example also be taken into consideration for improved biting point adaptation.

In a further preferred embodiment, the termination operating state, in which the integration step is ended, is attained when a termination control value of the pump less than or equal to the operating point control value has been attained and a defined minimum filling time has been exceeded.

In this embodiment, the termination operating state is defined by being determined from the values of the operating point. Furthermore, a minimum filling time is defined that must be exceeded in order for the integration to be ended. This prevents the operating point control value being exceeded, as a result of fluctuations of the control value, during the starting of the pump.

In a further preferred embodiment of the parameterization method, the pressure port of the pump is connected via an orifice or a baffle to a low-pressure section of the actuator arrangement.

In this embodiment, an additional baffle is situated in the regulating loop. The incorporation of a baffle/orifice between the pressure port of the pump and a tank of the actuator arrangement leads to improved regulability of the actuator arrangement.

In a further preferred embodiment of the parameterization method, the control value of the pump is an electrical current of an electric motor that drives the pump.

In this embodiment, the pressure that is built up by the pump is dependent on the electrical current of an electric motor that drives the pump. The set pressure is at the same time a significant parameter for the determination of the operating point of the clutch to be actuated. This embodiment thus makes it possible for the operating point to be specified as an electrical current value. Furthermore, the control of the pump by means of the electrical current permits precise and fast regulation of the pump.

In a further preferred embodiment, the predetermined operating point is a biting point of a friction clutch that is actuated by means of the hydraulic actuator arrangement.

In this embodiment, the actuator arrangement actuates a friction clutch, and the predetermined operating point is the engagement point of the clutch. The engagement point or biting point is to be understood to mean the point at which the friction clutch transmits a defined low torque of generally less than 10 Nm. The engagement point may be determined by means of a variety of methods, and the parameters thereof serve as first input values for the method according to the invention.

It is self-evident that the features mentioned above and the features yet to be explained below may be used not only in the respectively specified combination but also in other combinations or individually without departing from the scope of the present invention.

BRIEF DESCRIPTION OF THE SEVERAL VIEWS OF THE DRAWINGS

Exemplary embodiments of the invention are illustrated in the drawings and will be explained in more detail in the following description. In the drawings:

FIG. 2 shows the pressure profile at a friction clutch over time;

FIG. 3 shows the rotational speed profile of an electric pump in an actuator arrangement over time during the actuation of a clutch;

FIG. 4 shows the electrical current profile of an electric motor for operating a pump in an actuator arrangement over time during the actuation of a clutch;

FIG. 5 shows the fluid volume flow rate of an electric pump in an actuator arrangement over time during the actuation of a clutch.

DETAILED DESCRIPTION OF PREFERRED EMBODIMENTS

Figure 1:
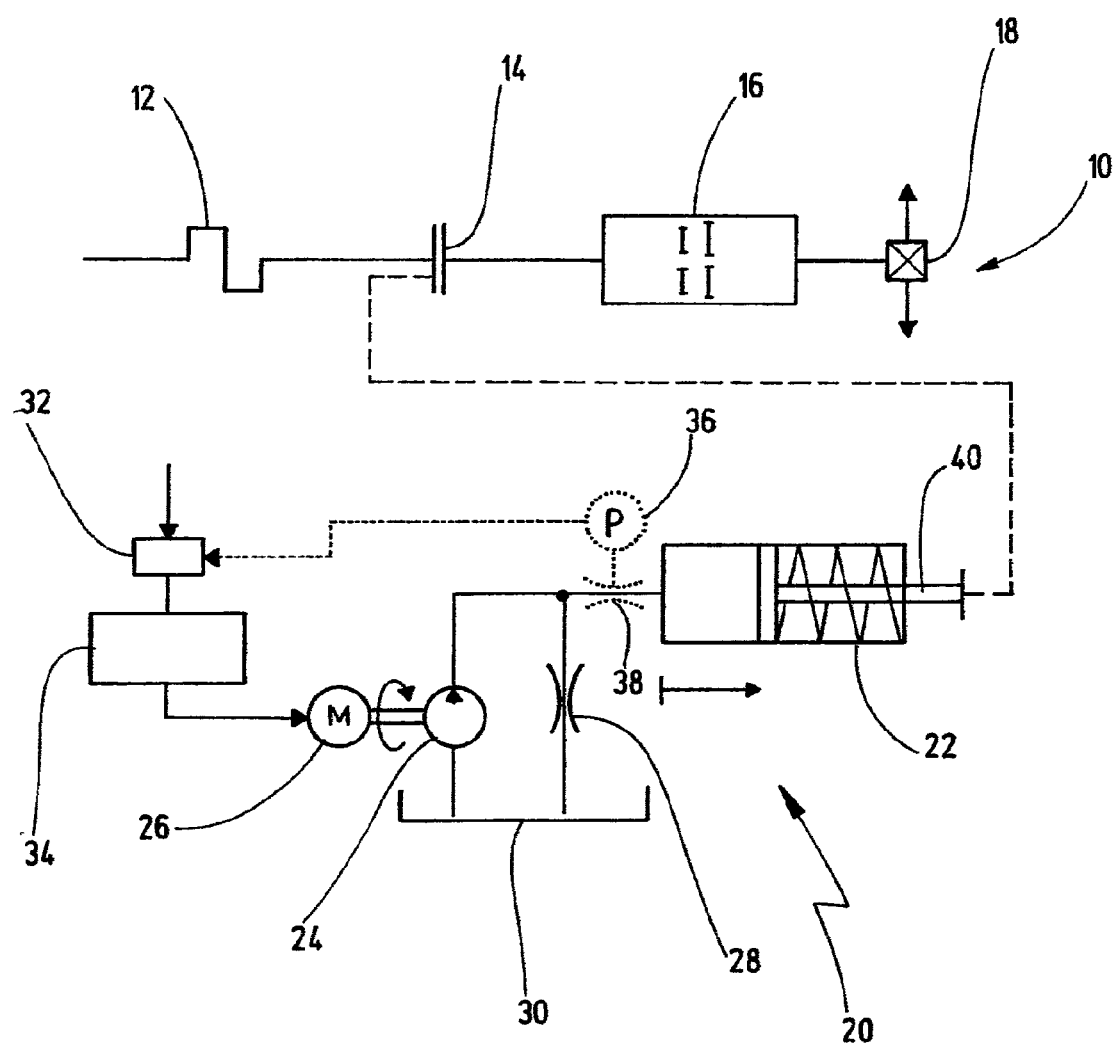
FIG. 1 is a schematic illustration of the hydraulic actuator arrangement and of a motor vehicle drivetrain.

In FIG. 1, the reference numeral 10 denotes a conventional motor vehicle drivetrain having an engine 12, a clutch 14, a transmission 16 and a differential 18. The engine 12, generally an internal combustion engine, is connected via a drive shaft to a friction clutch 14. The clutch is connected at the output side to the transmission 16, which at its output side operates a differential 18 that drives the wheels of the vehicle.

It is the object of the clutch 14 to transmit the torque of the drive engine 12 to the transmission 16. Said clutch is configured as a powershift clutch and must be able to also transmit high torques at least briefly. For comfortable clutch engagement, the friction clutch must be transferred from the open state into the closed state via a slipping state. In this exemplary embodiment, this is realized by means of a hydraulic actuator arrangement 20.

The hydraulic actuator arrangement 20 comprises a hydraulic cylinder 22, a pump 24 and an electric motor 26. The pump 24 is, at the outlet side, connected by way of its pressure port 25 directly to the cylinder 22. An additional baffle/orifice 28 between the pressure port of the pump and the tank increases the regulability of the actuator arrangement. The tank is furthermore connected to the suction port of the pump in order to close the hydraulic circuit.

The electric motor 26 which drives the pump 24 is connected to a control unit 34. The control unit 34 regulates the supply of electrical current to the motor and thus the rotational speed ω of the connected pump 24.

The reference numeral 32 indicates a precontrol unit connected upstream of the control unit 34. The precontrol unit 32 processes the adjustment parameter determined by means of the method according to the invention, and transmits this to the control unit 34.

Also shown here is an optional pressure sensor 36 with a baffle/orifice 38 at the port of the hydraulic cylinder 22, which pressure sensor is however preferably no longer required in the case of the method according to the invention, and can thus be omitted.

The method for determining the adjustment parameters for the arrangement described in FIG. 1 will be explained in detail using the regulating loop illustrated in FIG. 6. Here, the diagrams of FIGS. 2, 3, 4 and 5 illustrate in each case the respective profile of the relevant operating parameters of the actuator arrangement over time. The operating parameters include the pressure profile P in the hydraulic cylinder 22, the rotational speed ω of the pump 24, the electrical current I of the electric motor 26, and the fluid volume flow rate φ to the hydraulic cylinder 22.

Figure 6:
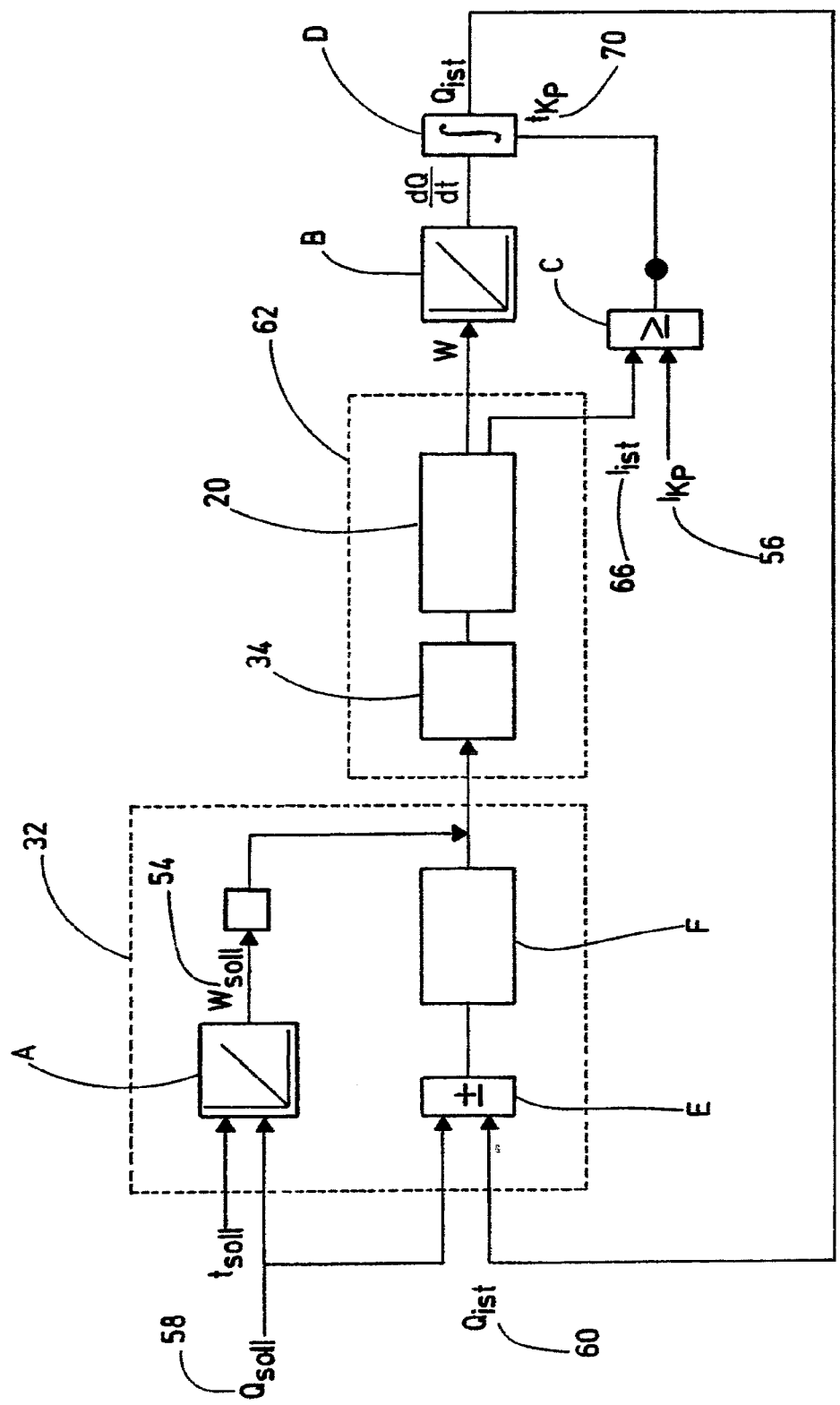
FIG. 6 schematically shows a regulating loop for the implementation of the method according to the invention.

The reference signs A to F in FIG. 6 indicate the regulating elements relevant for the method. The characteristic curves A, B of pumps serve firstly for the determination of a rotational speed value $\omega_{soil}$ 54 from a predefined volume Q and a time duration t, and secondly for the determination of the volume flow rate φ from a given pump rotational speed ω. The regulating element C compares the present electrical current value I 66 with the operating point control value $I_{KP}$ 56. When the two values are equal, the termination operating state $t_{KP}$ 70 has been attained. The integrator element D performs integration of the function of the volume flow rate until the termination operating state is indicated by C. The comparator E compares the actual and setpoint volumes, whereupon F readjusts the rotational speed $\omega_{soil}$ of the pump 24.

The middle block 62 bordered by a dashed line in FIG. 6 corresponds to a hitherto known control system composed of a control unit 34 and a hydraulic actuator arrangement 20. Here, the reference sign 32 encompasses all of the elements belonging to the precontrol unit 32.

The starting point for the method is the determination of a first set of relevant operating parameters. These are firstly the operating point rotational speed value $\omega_{soil}$ 54 and secondly the operating point control value $I_{KP}$ 56 of the actuator arrangement 20. Both values must be determined during the course of the determination of the operating point 50 of the element to be actuated. The parameters are consequently the values that prevail at the actuator arrangement 20 as present values when the operating point is attained.

If the element to be actuated is, for example, a friction clutch 14, the operating point 50 is the biting point of the clutch 14. Here, the time point $t_{KP}$ 70 at which the biting point is attained is significantly dependent on the pressure in the hydraulic cylinder. The theoretical pressure profile P is illustrated in FIG. 2. The pressure initially rises in ramp form until the operating point 50, in this example the so-called biting point, is attained, and the clutch begins to engage. The pressure profile P can no longer be illustrated in a defined manner beyond the time point at which the operating point $t_{KP}$ 70 is attained.

FIGS. 3 and 4 show the profile of the operating parameters (I, ω) of the actuator arrangement over time. The time value $t_{KP}$ for the operating point 50 has been carried over into these diagrams from FIG. 1 by means of the dashed line.

FIG. 3 describes, correspondingly to FIG. 2, the profile of the rotational speed ω of the pump 24 during the actuation of the clutch 14. The pump 24 attains the demanded setpoint rotational speed quickly and maintains said setpoint rotational speed constantly until the operating point 50 (biting point) is attained. The operating point rotational speed value $\omega_{soil}$ 54 corresponds to the value of the rotational speed when the operating point 50 is attained.

Analogously to the preceding figures, FIG. 4 shows the electrical current profile I at the electric motor 26 for operating the pump 24. After initial fluctuations during the starting of the pump 24, the electrical current I subsequently rises proportionally in relation to the pressure P. The operating point control value $I_{KP}$ 56 corresponds to the magnitude of the electrical current at the time at which the operating point 50 is attained.

Here, the method used for determining the operating point 50 is not of significance for the method according to the invention. It is necessary merely for the parameters 54, 56 present when the operating point ($t_{KP}$) is attained to be measured and provided to the controller 32, 34. In order to utilize the advantages of the method according to the invention to best effect, a method is preferred that can determine the biting point without additional pressure sensors. Alternatively, however, use may be made of any other method for determining the operating point.

On the basis of the determined parameters, in a first method step, the pump 24 is regulated to the operating point rotational speed value 54, such that the pump 24 delivers a corresponding fluid volume flow rate φ. At the same time, the integration of the fluid volume flow rate φ over time begins. The fluid volume flow rate φ may be determined here from the present rotational speed of the pump and the associated pump characteristic curve. With increasing volume in the cylinder, the restoring force and thus also the electrical current required for operating the pump at a constant rotational speed increase.

Here, the present electrical current value $I_{ist}$ is continuously compared with the previously determined operating point control value $I_{KP}$ 56. When the electrical current value assumes a value equal to the operating point control value 56, the integration is stopped. In order that the integration is not stopped too early, a minimum filling time $t_{min}$ 68 is defined. This is necessary in order to avoid a situation in which fluctuations in the electrical current profile at the start of the actuation cause the integration to be inadvertently terminated because, as a result of the fluctuation, the operating point control value $I_{KP}$ has already been briefly exceeded at the start.

The result of the integration yields the parameters to be determined by means of the method. Said parameters are firstly the present volume $Q_{ist}$ 60 required for filling the hydraulic cylinder until the operating point is attained, and secondly the corresponding time T 64 required for this process.

FIG. 5 graphically illustrates the process. In this diagram, correspondingly to the preceding figures, the fluid volume flow rate φ is plotted over time. The hatched area corresponds in this case to the volume $Q_{ist}$ 60 to be determined by means of the method, which volume has flowed into the hydraulic cylinder over the time duration T 64.

The two parameters 60, 64 are transmitted to the precontrol unit. The volume parameter 60 is compared with the original volume setpoint value 54 at the comparator E, whereupon the regulator F adapts the rotational speed of the pump for the next actuation process.

With the next actuation of the actuator arrangement 20, the measurement begins again, such that a regulating loop is formed and the adjustment parameters of the actuator arrangement 20 are continuously adapted.

The invention claimed is:

1. Method for determining an adjustment parameter in a hydraulic actuator arrangement for a motor vehicle drivetrain, wherein the actuator arrangement has a pump and a hydraulic cylinder, wherein a pressure port of the pump is connected to a port of the hydraulic cylinder, wherein the adjustment parameter is a function of the volume of the fluid that must be delivered by the pump in order to realize a predetermined operating point of the actuator arrangement, wherein the operating point is defined by a value pair of an operating point rotational speed value of the pump and an operating point control value of the pump, having the steps:
   regulating the pump to the operating point rotational speed value such that the pump delivers a fluid volume flow rate corresponding to the operating point rotational speed value; and
   integrating the fluid volume flow rate over the time until a termination operating state of the actuator arrangement, in which a control value of the pump is less than or equal to the operating point control value, wherein the adjustment parameter includes the fluid volume measured by means of the integration step; and
   comparing the fluid volume determined by the integration step with a volume setpoint value, and adjusting the operating point rotational speed value of the pump for the next actuating process of the actuator arrangement.

2. Parameterization method according to claim 1, wherein the adjustment parameter includes the filling time required for attaining the termination operating state.

3. Parameterization method according to claim 1, wherein the termination operating state, in which the integration step is ended, is attained when a termination control value of the pump less than or equal to the operating point control value has been attained and a defined minimum filling time has been exceeded.

4. Parameterization method according to claim 1, wherein the pressure port of the pump is connected via an orifice to a low-pressure section of the actuator arrangement.

5. Parameterization method according to claim 1, wherein the control value of the pump is an electrical current of an electric motor that drives the pump.

6. Parameterization method according to claim 1, wherein the predetermined operating point is the engagement point of a friction clutch that is actuated by means of the hydraulic actuator arrangement.

7. Method for determining an adjustment parameter in a hydraulic actuator arrangement for a motor vehicle drivetrain, wherein the actuator arrangement has a pump and a hydraulic cylinder, wherein a pressure port of the pump is connected to a port of the hydraulic cylinder, wherein the adjustment parameter is a function of the volume of the fluid that must be delivered by the pump in order to realize a predetermined operating point of the actuator arrangement, wherein the operating point is defined by a value pair of an operating point rotational speed value of the pump and an operating point control value of the pump, having the steps:
   regulating the pump to the operating point rotational speed value such that the pump delivers a fluid volume flow rate corresponding to the operating point rotational speed value; and
   integrating the fluid volume flow rate over the time until a termination operating state of the actuator arrangement, in which an actual control value of the pump is less than or equal to the operating point control value.

8. Parameterization method according to claim 7, wherein the adjustment parameter has the fluid volume measured by means of the integration step.

9. Parameterization method according to claim 7, wherein the adjustment parameter has the filling time required for attaining the termination operating state.

10. Parameterization method according to claim 7, wherein the termination operating state, in which the integration step is ended, is attained when a termination control value of the pump less than or equal to the operating point control value has been attained and a defined minimum filling time has been exceeded.

11. Parameterization method according to claim 7, wherein the actual control value of the pump is an electrical current of an electric motor that drives the pump.

12. Parameterization method according to claim 7, wherein the predetermined operating point is the engagement point of a friction clutch that is actuated by means of the hydraulic actuator arrangement.

13. Method for actuating a friction clutch of a motor vehicle drivetrain by means of a hydraulic actuator arrangement which has a pump and a hydraulic cylinder, wherein a pressure port of the pump is connected to a port of the hydraulic cylinder, wherein the friction clutch is coupled to a piston of the hydraulic cylinder, and wherein an operating point of the actuator arrangement, which is defined by a value pair of an operating point rotational speed value of the pump and an operating control value of the pump, and which corresponds to an operating point of the friction clutch, is adjusted using an adjustment parameter that has been determined by means of a determination method, having the steps:
   regulating the pump to the operating point rotational speed value such that the pump delivers a fluid volume flow rate corresponding to the operating point rotational speed value; and
   integrating the fluid volume flow rate over the time until a termination operating state of the actuator arrangement, in which an actual control value of the pump is less than or equal to the operating point control value.

14. Actuating method according to claim 13, wherein the adjustment parameter is used as a precontrol value in a regulating loop that regulates the position and/or the pressure of the friction clutch by means of the hydraulic actuator arrangement.

* * * * *

UNITED STATES PATENT AND TRADEMARK OFFICE
CERTIFICATE OF CORRECTION

PATENT NO. : 8,897,981 B2  
APPLICATION NO. : 14/061809  
DATED : November 25, 2014  
INVENTOR(S) : Jörg Meissner et al.

Page 1 of 1

It is certified that error appears in the above-identified patent and that said Letters Patent is hereby corrected as shown below:

In the Specification

In the patent, column 5, lines 49, 59 and 67, delete "ωsoil" and insert --ωsoll--

In the patent, column 6, line 29, delete "ωsoil" and insert --ωsoll--

Signed and Sealed this  
Sixteenth Day of June, 2015

Michelle K. Lee  
*Director of the United States Patent and Trademark Office*